United States Patent [19]
Maglica

[11] Patent Number: 5,804,331
[45] Date of Patent: Sep. 8, 1998

[54] BATTERY DEVICE

[75] Inventor: Anthony Maglica, Anaheim, Calif.

[73] Assignee: Mag Instrument, Inc., Ontario, Calif.

[21] Appl. No.: 196,860

[22] Filed: Feb. 15, 1994

[51] Int. Cl.$^6$ ...................................................... H01M 2/10
[52] U.S. Cl. ................................. 429/99; 429/100; 429/8; 429/121; 429/178; 429/179; 429/161
[58] Field of Search ................................. 429/99, 100, 8, 429/121, 178, 179, 161

[56] References Cited

U.S. PATENT DOCUMENTS

| | | | |
|---|---|---|---|
| 1,568,093 | 1/1926 | Shannon | 362/207 |
| 1,599,095 | 9/1926 | McCabe | 362/207 |
| 2,272,907 | 2/1942 | Deibel | 362/194 |
| 4,851,974 | 7/1989 | Maglica | 362/187 |
| 4,873,160 | 10/1989 | Miyazaki | 429/170 |
| 5,229,220 | 7/1993 | Stanton et al. | 429/1 |
| 5,326,656 | 7/1994 | Meadows et al. | 429/178 |
| 5,443,924 | 8/1995 | Spellman | 429/65 |

*Primary Examiner*—Geraldine Letscher
*Attorney, Agent, or Firm*—Lyon & Lyon

[57] ABSTRACT

A device for a battery with a spacer preventing direct physical contact between first and second batteries arranged in physical series. A resilient conductor providing an electroconductive contact between a center electrode of the first battery and a terminal electrode of the second battery is held by the spacer.

8 Claims, 6 Drawing Sheets

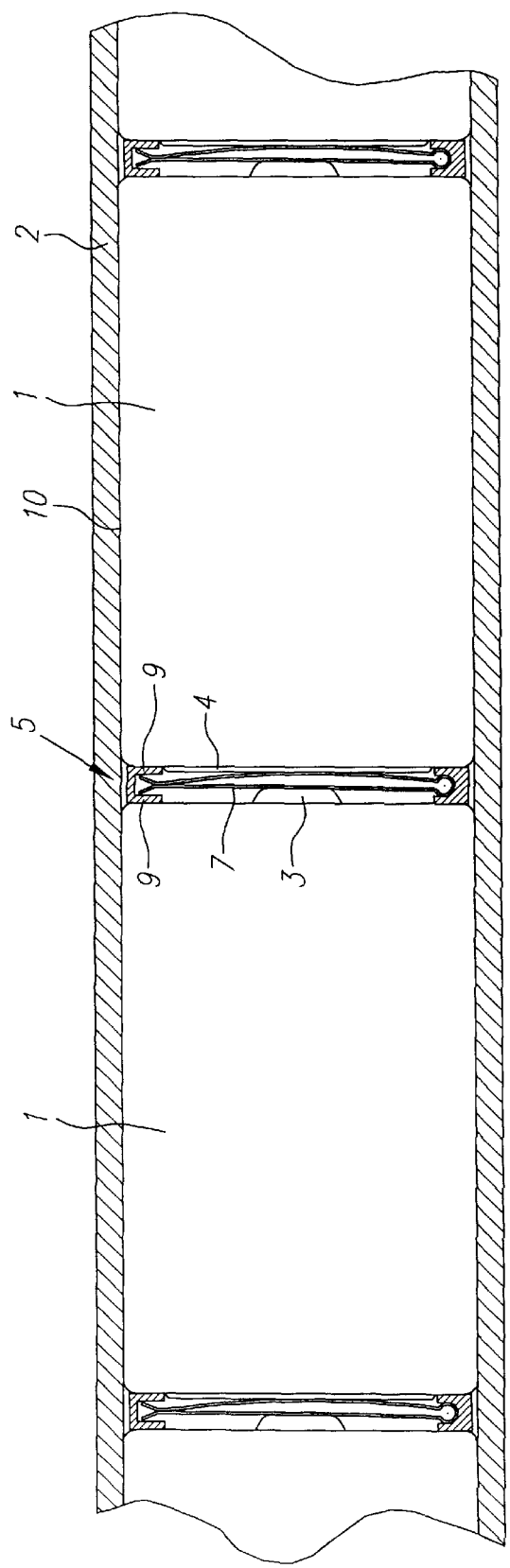
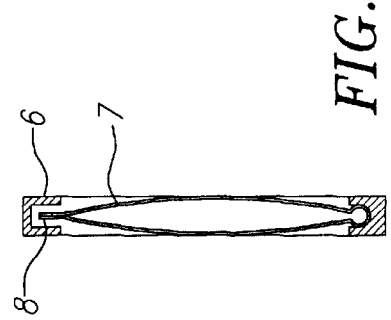
FIG. 1
FIG. 3
FIG. 2

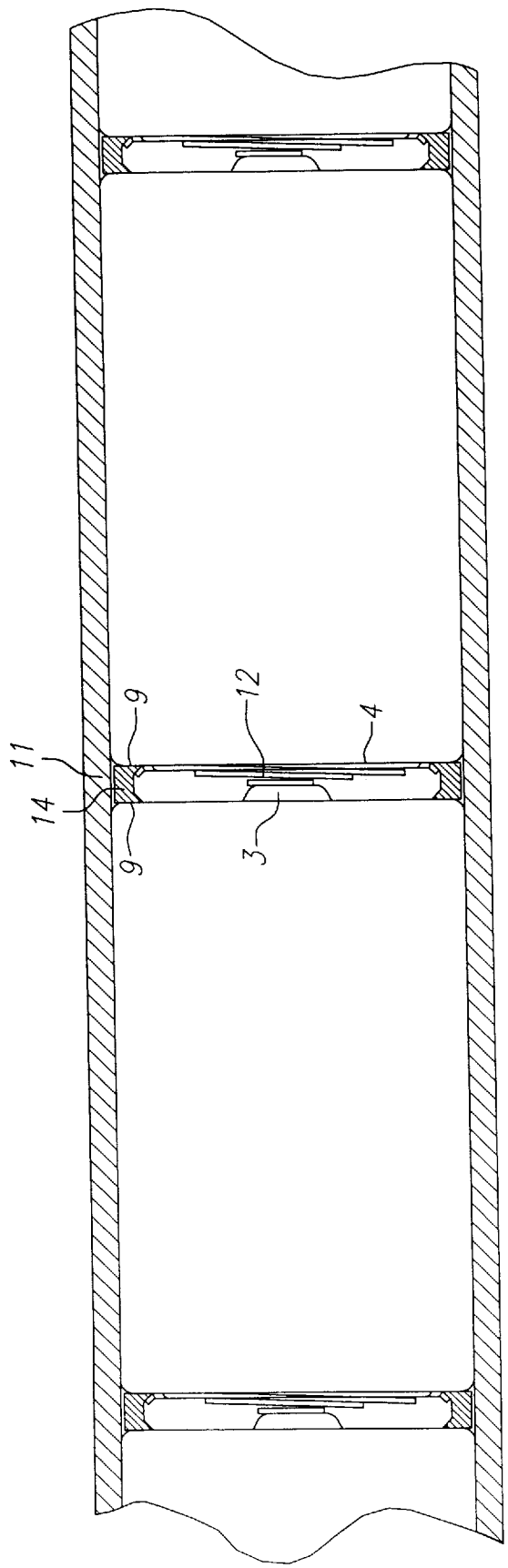
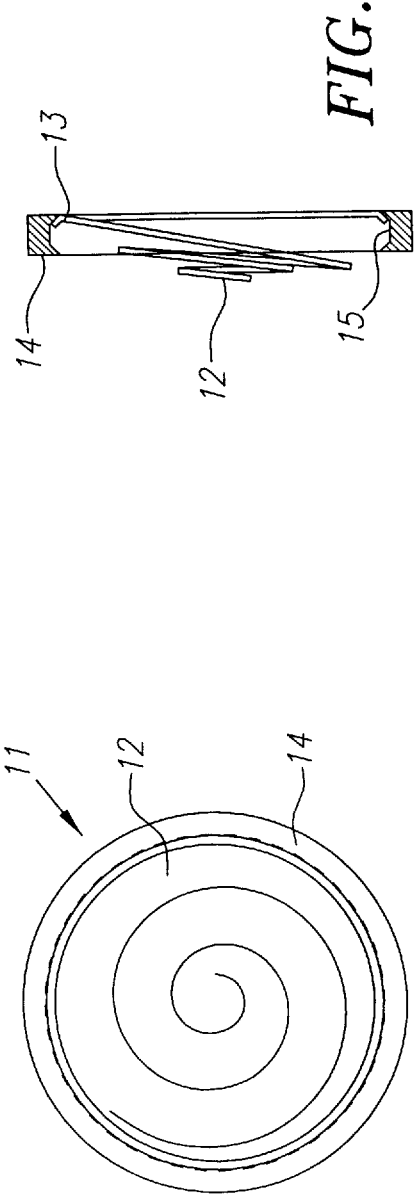
FIG. 4
FIG. 5
FIG. 6

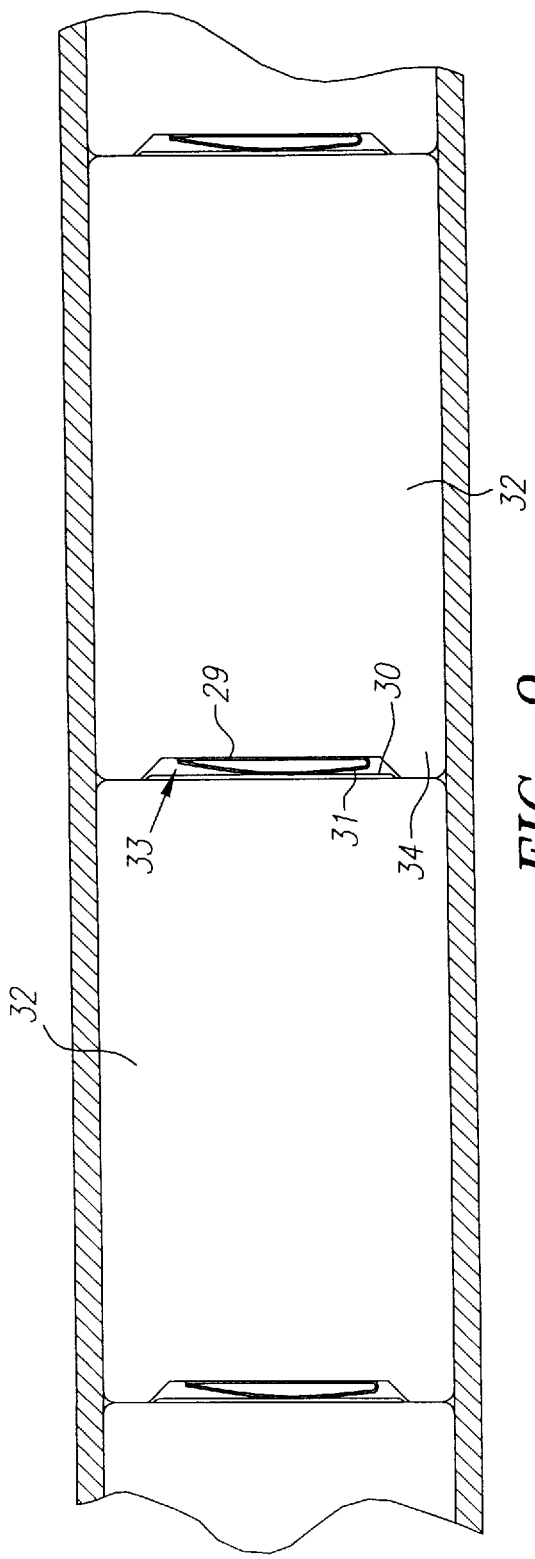
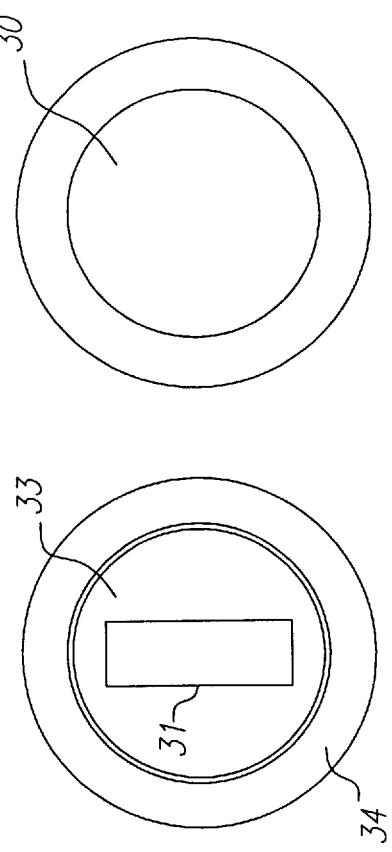
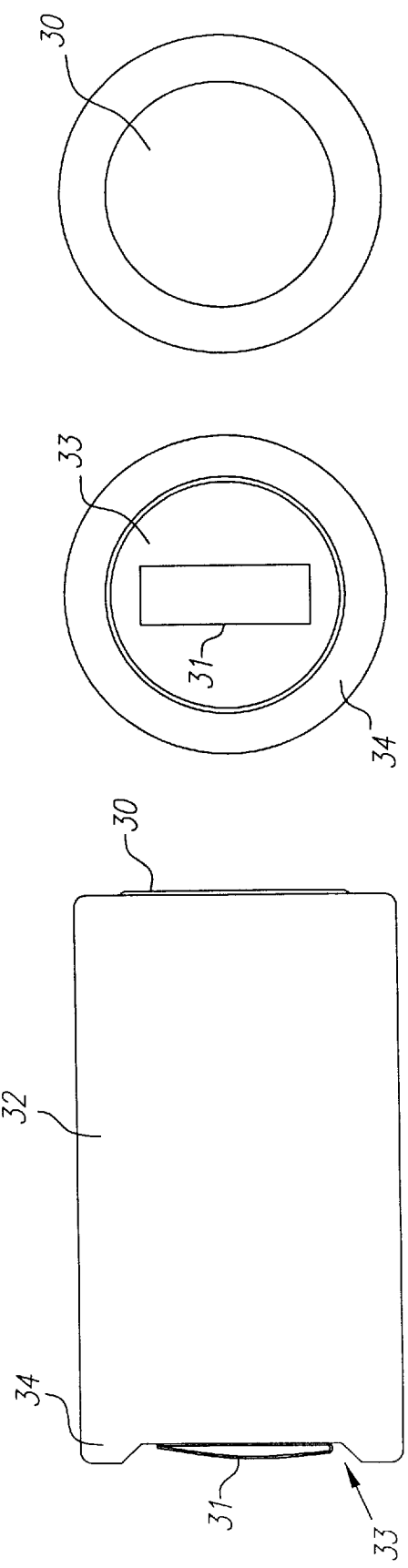

BATTERY DEVICE

BACKGROUND OF THE INVENTION

The field of the present invention is devices for protecting battery electrodes.

Dry cell batteries typically used for portable devices such as flashlights, toys and the like are cylindrical and are provided with a center electrode and a terminal electrode. The center electrode is usually formed as a pin like protrusion having a diameter which is much smaller than the outside diameter of the battery. This center electrode usually forms the positive pole. At the other end of the battery, a terminal electrode is formed which is shaped as a flat contact plate having a much larger diameter than the center electrode. Frequently, the batteries are arranged physically as well as electrically in series in that the center electrode of a first battery directly contacts the terminal electrode of a second battery. If more than two batteries are provided, the center electrode of the second battery directly contacts a terminal electrode of a third battery and so on.

In a flashlight for example, an electrical circuit is typically established from one electrode of a battery, e.g. the center electrode of the foremost battery, through a conductor to a switch, and then to one electrode of the lamp bulb. After passing through the filament of a lamp bulb, the electric circuit emerges through a second electrode of the lamp bulb in electroconductive contact with a conductor, which in turn is electroconductively connected with the flashlight housing. The flashlight housing itself when made of metal, or a conductor extending along the inner side of the housing, e.g. if the housing is made of plastic, typically provides an electroconductive path to an electrical conductor, generally a spring element, which is in contact with the other electrode of a battery, i.e. typically the terminal electrode of the rearmost battery. Actuation of the switch to complete the electrical circuit enables electrical current to pass through the filament, thereby generating light which is typically focussed by a reflector to form a beam of light.

In the case of medium and larger sized batteries or rechargeable storage batteries, which are often used in flashlights for public safety purposes by police and fire protection personnel, the electrodes of the batteries may be deformed by physical impact to which the flashlight may be subjected. On the one hand, the terminal electrode might be deformed since it comprises a relatively large diameter and, therefore, a low rigidity. On the other hand, the center electrode might be deformed since it is subjected to a relatively high compressive stress due to it's small diameter. In particular, it often happens that besides a deformation of the pin like protrusion itself another deformation pushing the whole pin like protrusion along the center axis of the battery takes place. Although the problems above can occur if only two batteries are connected in series, the electrodes are even more likely to be deformed if a column consisting of a larger number of batteries is provided, e.g. a column of four or five batteries, since the weight of the battery column is larger when more batteries are provided. Therefore, the impact shock received by the electrodes is increased with greater numbers of batteries. The probability of a deformation is still higher if heavier batteries comprising a larger outside diameter are used since in this case the impact shock is still further increased. If an extensive deformation of the electrodes has taken place, the rearmost electrode might loose contact with the rearmost conductor which is generally a spring conductor, or the foremost electrode might loose contact with the conductor connected to one of the two electrodes of the lamp bulb. Moreover, it is possible that the electrodes of the batteries will loose contact with each other so that they are spaced with respect to each other in lengthwise direction. In this case, the electric circuit is no longer closeable and therefore the lamp bulb can no longer be switched on.

SUMMARY OF THE INVENTION

The present invention is directed to a device for protecting battery electrodes. The device includes a spacer to displace the end of a battery from a terminal and a resilient conductor to extend effectively the electrode to overcome the displacement.

In a first and separate aspect of the present invention, a device including a resilient conductor and a spacer are arranged such that the spacer is annularly disposed and the resilient conductor extends outwardly of the spacer in a first direction such that electrical contact may be achieved with both an electrode of the associated battery and a terminal from which the battery has been displaced by the spacer.

In a second and separate aspect of the present invention, the aforementioned device may include a nonconductive ring as a spacer of a diameter to match the battery casing diameter of a selected standard battery. The spacer may be of sufficient thickness to exceed the extension of a center electrode protruding from the end of a battery. These relationships assist in locating the device and avoiding impact stresses on the electrodes of a standard dry cell battery.

In a third and separate aspect of the present invention, a device having a resilient conductor and a spacer is contemplated. The conductor is defined by a central conductive element, resilient in construction located at the terminal of a battery. The spacer is defined by an extension on the case which extends to or beyond the height of the battery terminal. The resilient conductor extends outwardly of that extension on the case.

In a fourth and separate aspect of the present invention, a device incorporating one or more of the foregoing aspects is placed in association with a flashlight where dry cell batteries are conventionally arranged in physical series. Without the device, this arrangement can result in damage to the battery electrodes upon axial impact of the flashlight. The device provides for protection of the electrodes.

Accordingly, it is an object of the present invention to provide a device for protecting conventional dry cell batteries. Other and further objects and advantages will appear hereinafter.

BRIEF DESCRIPTION OF THE DRAWINGS

FIG. 1 shows a section of a first embodiment of the battery device disposed between adjacent batteries.

FIG. 2 shows a front view of the first embodiment of the battery device.

FIG. 3 shows a section of a first embodiment of the battery device.

FIG. 4 shows a section of a second embodiment of the battery device disposed between adjacent batteries.

FIG. 5 shows a front view of the second embodiment of the battery device.

FIG. 6 shows a section of a second embodiment of the battery device.

FIG. 9 shows a section of a another embodiment showing a batteries according to the invention with a resilient conductor portions disposed therebetween.

FIG. 10 shows a side view of the battery device according to the third embodiment.

FIG. 11 shows a front view of the battery device shown in FIG. 10.

FIG. 12 shows a rear view of the battery shown in FIG. 10.

DETAILED DESCRIPTION OF PREFERRED EMBODIMENTS

Figure 7:
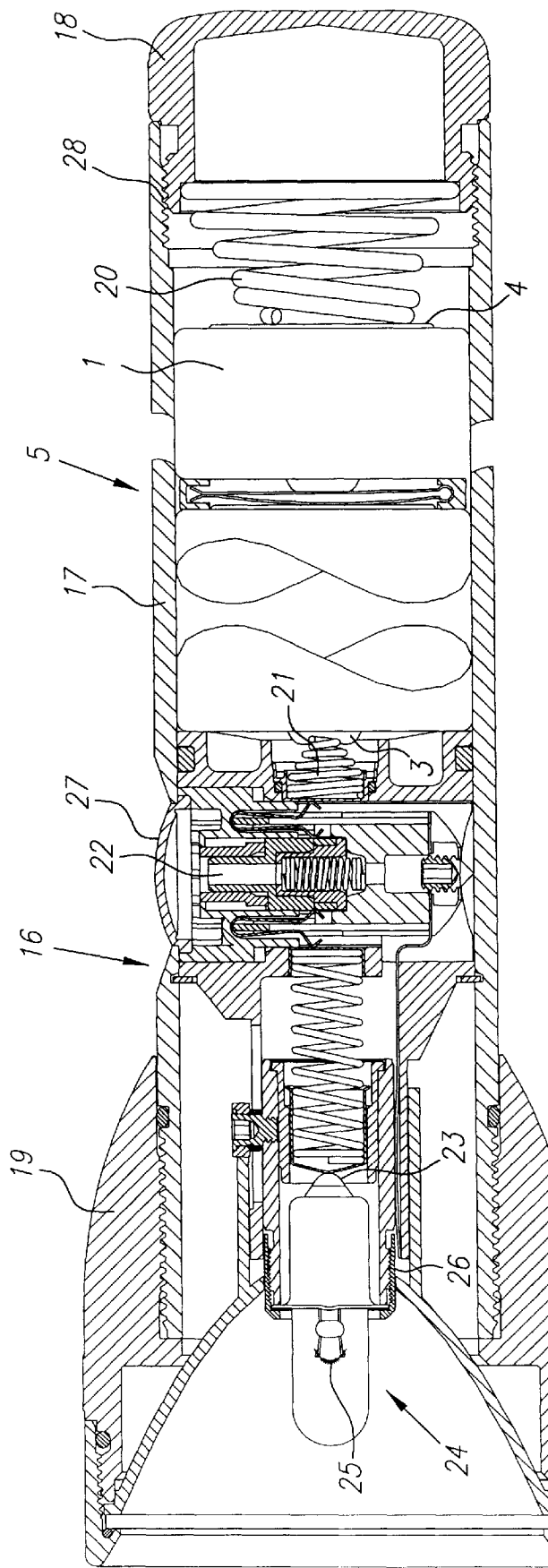
FIG. 7 shows a section of a flashlight provided with said battery device.

As shown in FIG. 1, a plurality of batteries 1 are connected in series in a manner such that they form a column. This column might be provided within a housing or barrel 2 of the electric apparatus. Every battery 1 is provided with a center electrode 3 which is typically the positive pole; and with a terminal electrode 4 which is typically the negative pole of the battery 1. A device, generally designated 5, is sandwiched between adjacent batteries 1. The device 5 is also shown separately in FIGS. 2 and 3.

The device 5 is provided with a spacer 6 and a resilient conductor 7. The spacer 6 has two opposing recesses 8 receiving the resilient conductor 7. The spacer 6 is annularly disposed with a hole extending fully therethrough. As shown, it constitutes a ring which may fit within a flashlight barrel 2 or the like. The ring 6 is sized to abut against an end 9 of a battery casing 10 for a given standard size battery and is thicker than the distance the center electrode 3 on the given size of standard dry cell battery extends beyond the end of the battery casing. As such flashlight barrels 2 are sized to accommodate specific standard sized cells 1, the ring 6 will also be appropriately located within the barrel 2 to abut against the ends 9 of the battery casings 10.

The resilient conductor 7 is integrally formed from a strip of metal sheet by bending. Two leaf springs are formed to be substantially congruent with respect to each other but slightly bent apart from each other at their middle portion as shown in FIG. 3. A loop connects the two defined leaf springs.

The electroconductive contact between the electrodes 3 and 4 of the adjacent batteries 1 is provided by the resilient conductor 7. The conductor 7 is elastically deformed by the adjacent batteries 1 in a manner such that the resilient conductor 7 is pressed against the electrodes 3 and 4 to insure adequate contact.

FIGS. 4 to 6 show a second embodiment of the battery contact, generally designated 11. As shown in the drawings the resilient conductor 12 is formed as a helical spring which is built by pressing and cutting a round plate in a spiral-like manner and deforming it to extend the spiral axially. Moreover, the round plate is punched to provide an annular rim 13. The spacer 14 according to the second embodiment is provided with an annular groove 15 into which the annular rim 13 is inserted.

As shown in FIG. 4, the spacer portion 14 is sandwiched between the ends 9 of the battery casings as already demonstrated by the first embodiment. The center electrode 3 is pressed against the resilient conductor 12 formed as a spiral spring, i.e., against that innermost turn of the spring which has the smallest diameter. On the other hand, the terminal electrode 4 is pressed against one or more of the outer windings of the spring.

FIG. 7 shows a section of a flashlight comprising the batteries 1 and the battery device 5 according to the first embodiment sandwiched between the batteries 1. The batteries 1 and the battery device 5 are disposed within a flashlight housing 16 which comprises a cylindrical barrel 17, a tailcap 18 and a head assembly 19. For the sake of simplifying the drawings, only two batteries 1 are shown. Depending on how long the flashlight is, more batteries 1 with respective devices 5 may be provided, e.g., five batteries 1 with four battery devices 5 sandwiched therebetween.

The tailcap 18 is provided with a spring-like electrical conductor 20 which is in contact with the terminal electrode 4 of the rearmost battery 1. On the other hand, the center electrode 3 of the foremost battery 1 is contacted by another spring-like conductor 21. This conductor 21 is connected by means of a switch 22 schematically shown in the drawings to a first electrode 23 of a lamp bulb 24. The first electrode 23 is connected with a filament 25 of the lamp bulb 24. This filament 24 in turn is electroconductively connected with a socket 26 of the lamp bulb 24. The socket 26 is electroconductively connected with the flashlight housing 16 made of aluminum. In the case that the switch 22 is closed which might be done by pressing a button 27, electrical current can flow through the batteries 1 and the battery device 5 therebetween to the center electrode 3 of the foremost battery 1 and further through the spring-like conductor 21 and the switch 22 through the electrode 23, the filament 25, the socket 26, the flashlight housing 16, a screw thread 28, the tailcap 18 and the spring-like rear conductor 20 to the terminal electrode 4 of the rearmost battery 1. With the switch 22 closed, the lamp bulb emits light. Since the batteries 1 are in contact with each other by means of the battery devices 5 and not directly by means of the battery electrodes 3 and 4, the batteries 1 are not deformed and therefore permanent electroconductive contact is provided between the electrodes 3 and 4 of the batteries 1.

Figure 8:
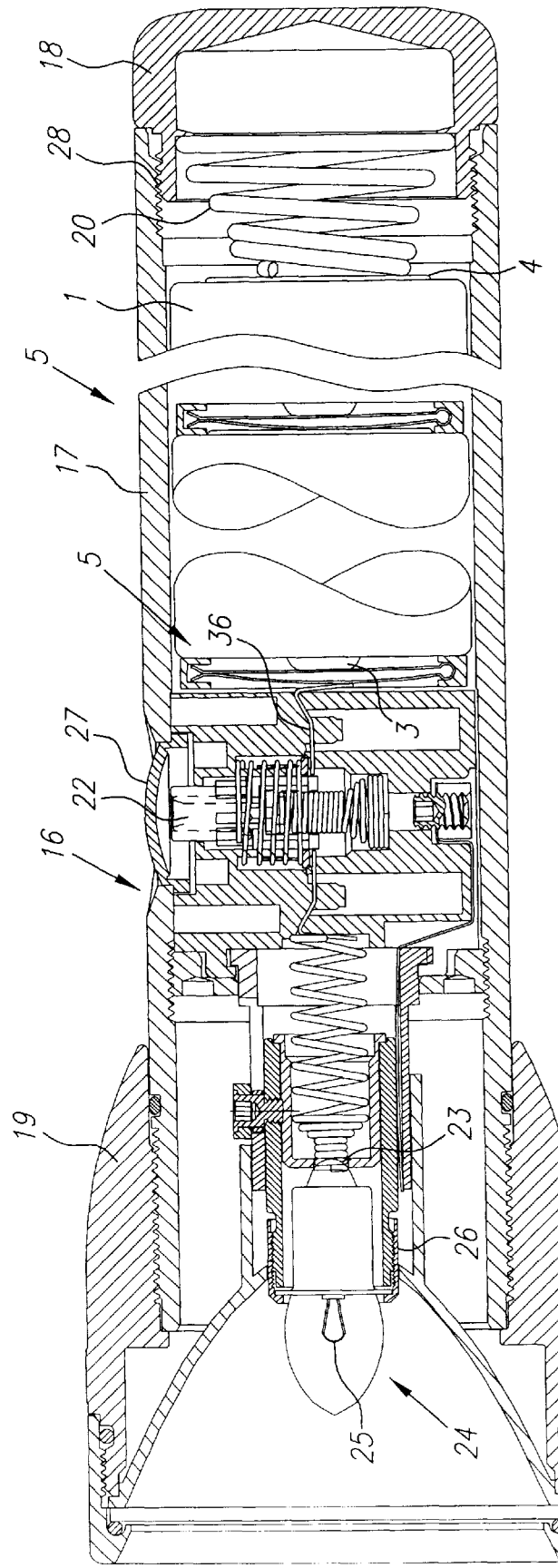
FIG. 8 shows a section of a flashlight similar to FIG. 7 but additionally provided with a foremost battery device.

FIG. 8 shows a section of the flashlight having a similar constructions as the one shown in FIG. 7. The same and analogous elements are designated by the same reference numbers and the description thereof is omitted to avoid repetitions. The main difference between the embodiment shown in FIG. 7 and 8 is that, instead of the spring-like conductor 21 contacting the center electrode 3 of the foremost battery, a substantially non resilient conductor 36 is provided which is electroconductively contacted by a foremost battery device 5. This guarantees that no deformation of the center electrode 3 can take place and a good electroconductive contact is always maintained between the non resilient conductor 36 and the center electrode 3 of the foremost battery 1 in the same way as if positioned between two adjacent batteries.

FIG. 9 shows another embodiment employing batteries 32 designed in a manner such that a center electrode 29 and a terminal electrode 30 are protected against deformation. A resilient conductor 31 provides electroconductive contact between the adjacent batteries 32 while the electrodes 29 and 30 are spaced from each other. A cup-shaped receiving space 33 for accommodating the resilient conductor 31 is bordered by a spacer 34 which is formed as an annular rim 34 encircling the center electrode 29. The cup-shaped receiving space 33 is closed by the terminal electrode 30 of the adjacent battery 32. According to the embodiment shown, the resilient conductor 31 is fixed to the center electrode 29. However, the resilient conductor 31 may also be loosely fitted into the receiving space 33 and resiliently pressed against the adjacent electrodes 29 and 30.

FIG. 10, 11 and 12 show the battery 32 separately. As shown in FIG. 10, the resilient conductor 31 of this embodiment does not protrude beyond the annular rim 34 since the terminal electrode 30 protrudes into the cup-shaped receiving space 33. However, it is also possible that the terminal electrode 30 is plain or even recessed and the resilient conductor 31 protrudes beyond the annular rim 34 to contact the terminal electrode 30 of the adjacent battery 32. It is also possible that both the center electrode 29 and the terminal electrode 30 are shaped identically and both provided with an resilient conductor 31.

Figure 13:
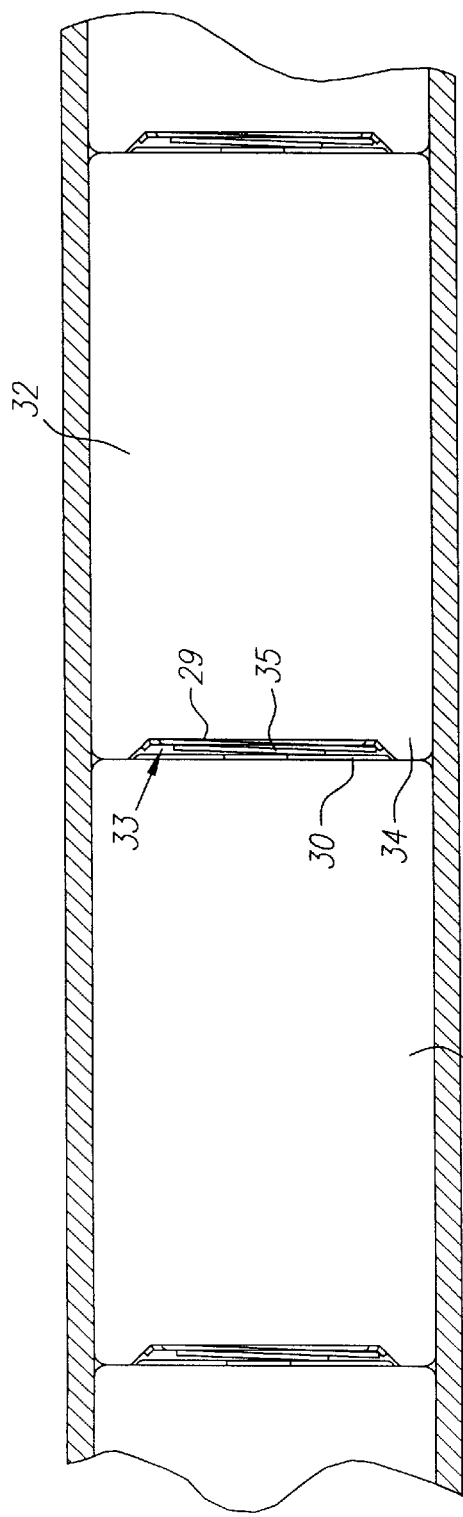
FIG. 13 shows a section of a fourth embodiment showing another kind of battery device according to the invention with resilient conductor portions disposed therebetween.
Figure 16:
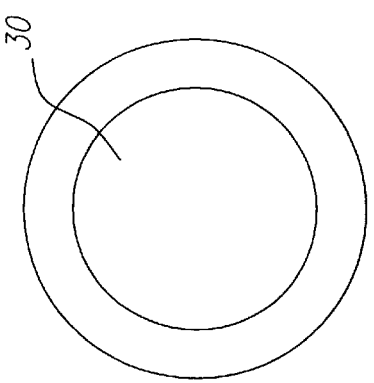
FIG. 16 shows a rear view of the battery shown in FIG. 13.
Figure 15:
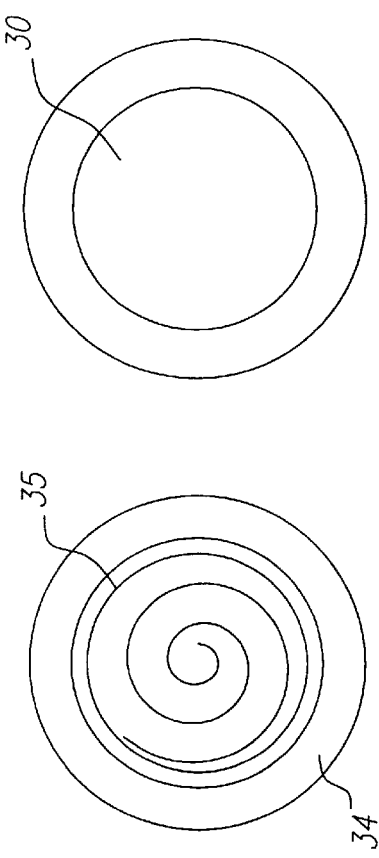
FIG. 15 shows a front view of the battery device shown in FIG. 13.
Figure 14:
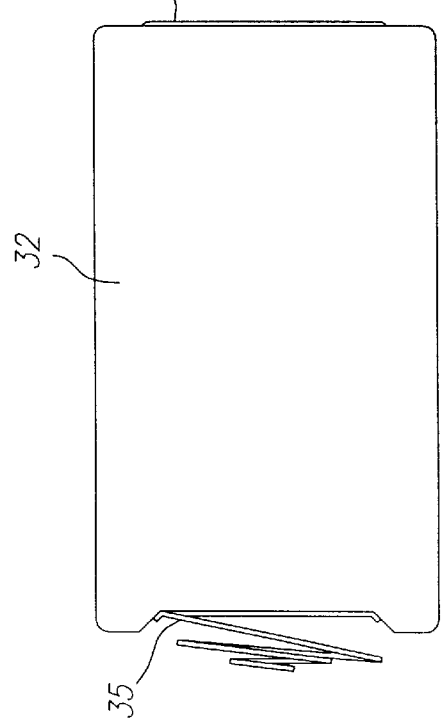
FIG. 14 shows a side view of the battery device according to the fourth embodiment.

As becomes apparent from FIGS. 10 and 11, the resilient conductor 31 is somewhat similar to the resilient conductor 7 shown in the first embodiment. A similar embodiment of the battery 32 is shown in FIG. 13 to 16. The same and analogous elements are designated by the same reference numbers and the description thereof is omitted to avoid repetitions. The main difference between the embodiment shown in FIG. 9 to 12 and the embodiment shown in FIG. 13 to 16 is the different shape of the resilient conductor designated 35. This resilient conductor 35 is similar to the resilient conductor 12 demonstrated by the second embodiment shown in FIG. 4 to 6. Moreover, although the terminal electrode 30 protrudes into the cup-shaped receiving space as shown in FIG. 13 and 14, the resilient conductor 35 protrudes beyond the spacer 34 as shown in FIG. 14.

Instead of providing the battery device shown in FIG. 1 to 6, the batteries 32 with an integral battery device and resilient conductor 31 or 35 of the embodiments shown in FIG. 9 to 16 can be provided within the flashlights shown in FIG. 7 and 8 for protecting the electrodes from being deformed.

While preferred embodiments of the herein invention have been described, numerous modifications, alterations, alternate embodiments, and alternate materials may be contemplated by those skilled in the art and may be utilized in accomplishing the present invention. It is envisioned that all such alternate embodiments are considered to be within the scope of the present invention as defined by the appended claims.

What is claimed is:

1. A device for a battery, comprising an electrically nonconductive spacer having a hole extending fully therethrough;

a resilient conductor in the hole, held by said spacer and extending outwardly of the spacer in an axial direction of the hole.

2. The device for a battery of claim 1, the resilient conductor being two leaf springs in electrical contact extending diametrically across the hole, at least one of the leaf springs being bowed to extend outwardly of the spacer in the axial direction of the hole.

3. The device for a battery of claim 1, the resilient conductor having an axially extended spiral spring of greater diameter at one end and of lesser diameter at the other end, the end of greater diameter being fixed to the spacer at the periphery of the hole.

4. The device for a battery of claim 1, the spacer being integral with the casing of the battery.

5. The device for a battery of claim 1, the resilient conductor having a center portion with a compressed thickness substantially less than the thickness of the spacer.

6. A device for a battery, comprising an electrically nonconductive circular spacer having a hole extending therethrough;

a resilient conductor in the hole, held by said spacer and extending outwardly of the spacer in an axial direction of the hole.

7. The device for a battery of claim 6, the spacer having a cavity extending about the periphery of the hole to receive the resilient conductor.

8. The device for a battery of claim 6, the spacer being separate from the battery.

* * * * *